(12) United States Patent
Bolgar et al.

(10) Patent No.: US 8,109,292 B2
(45) Date of Patent: Feb. 7, 2012

(54) INSERTION PIECE TO A SINGLE-GRIP MIXING FAUCET

(76) Inventors: Gyorgy Bolgar, Budapest (HU); Tamas Szarvas, Budapest (HU)

( * ) Notice: Subject to any disclaimer, the term of this patent is extended or adjusted under 35 U.S.C. 154(b) by 121 days.

(21) Appl. No.: 12/385,169

(22) Filed: Mar. 31, 2009

(65) Prior Publication Data
US 2009/0255599 A1    Oct. 15, 2009

(30) Foreign Application Priority Data

Apr. 1, 2008  (HU) .................................. 0800205

(51) Int. Cl.
*F16K 11/00*    (2006.01)
(52) U.S. Cl. .................. 137/625.17; 137/597
(58) Field of Classification Search ............. 137/625.17, 137/636.3, 597, 454.5, 454.6
See application file for complete search history.

(56) References Cited

U.S. PATENT DOCUMENTS

| | | | | |
|---|---|---|---|---|
| 4,362,186 A | * | 12/1982 | Parkison et al. | 137/625.17 |
| 4,960,154 A | * | 10/1990 | Dagiantis | 137/625.17 |
| 5,896,601 A | * | 4/1999 | Humpert et al. | 4/677 |
| 6,035,463 A | * | 3/2000 | Pawelzik et al. | 4/677 |
| 6,386,233 B1 | * | 5/2002 | Magocsi | 137/625.17 |
| 7,373,950 B2 | * | 5/2008 | Huang | 137/625.17 |

* cited by examiner

*Primary Examiner* — Kevin Lee
(74) *Attorney, Agent, or Firm* — Dowell & Dowell, P.C.

(57) ABSTRACT

An insertion piece to a single-grip mixing faucet developed as a control unit. On one side, the control unit is connected to a footing having warm and cold water inlets. On the other side, the control unit is connected to a driving arm. The control unit includes a fixed inlet disc and a moving control disc arranged above the inlet disc to form together a plane sealing. The side of the inlet disc opposite the control disc is coupled to the footing, whereas the side of the control disc opposite the inlet disc is in connection with a ceramic moving element, which, in turn, is in connection with the driving arm. The inlet disc includes at least one inlet opening for warm water, at least one inlet opening for cold water, and an outlet hole forming at least two outlet openings, preferably one for tub filling and one for shower filling. The driving arm independently controls the separate outlets.

6 Claims, 6 Drawing Sheets

INSERTION PIECE TO A SINGLE-GRIP MIXING FAUCET

BACKGROUND OF THE INVENTION

1. Field of the Invention

The invention relates to an insertion piece to a single-grip mixing faucet in which two outlets can be controlled independently with a single adjustable arm.

2. Description of Related Art

Thus the invention relates to an insertion piece applied in a single-grip mixing faucet, which on the one hand, produces water of appropriate temperature by mixing the cold and warm water in a suitable ratio, and on the other hand, the amount of the outflow water is also controlled properly. Faucets provided with such insertion pieces are widely applied for the water supply of tubs, lavatory-basins and sinks. For controlling the amount and temperature of the water flowing through them, a control unit, so-called cartridge is used. The cartridge used for mixing cold water and warm water comprises two ceramic discs arranged one above the other to form a plane sealing. Standard cartridges with two inlets, and one outlet are mainly applied. The control unit comprises a lower fixed, stationary inlet disc and an upper moving control disc arranged above each other. The opposite side of the control disc at to the inlet disc is in a forced connection with a ceramic moving element, which is, in turn, in an operating mechanical connection with the driving arm operating the faucet. One of the inlet openings is connected to the cold water network, the other one to the warm water network, whereas the mixed water leaves the cartridge through the outlet opening in an amount and with a temperature determined by the position of the two ceramic discs. The amount of the water flowing through can be adjusted by tilting the arm backwards usually in a range of 0°-25°, whereas the temperature can be adjusted by rotating the arm, in general in a range of ±45°-55° when taking the mid position as a base. Mixing faucets provided with such control units are suitable for application in lavatory-basins and sinks. However, armatures for bathtubs are provided almost always with shower heads, thus they should be furnished also with mechanical change valves. These change valves are very quickly used up, due to the deposition of scale crust, thus they require regular maintenance. A further draw-back is that the appropriate developing of the change valve in the metal housing of the faucet means additional manufacturing cost.

SUMMARY OF THE INVENTION

The aim of our invention is to develop a new type of control units having ceramic discs, i.e. that of a cartridge, eliminating the above draw-backs, which makes the control of two separate output openings possible independently from each other by one single adjustable driving arm, without using a change valve, so that it comprises also the switching function for the shower mode simplifying thereby the handling and development of the armature.

The invention consists in the fact that beside the inlet openings for the cold and hot water, two outlet openings are also to be found in the cartridge. One of the outlet openings is the outlet for the tub, the other one is for the shower. Opening and closing of the openings are realised by two ceramic discs similarly as in standard cartridges.

Thus the invention relates to a single-grip mixing faucet insertion developed as a control unit with ceramic insertion piece, which on its one side is connected to a footing, on the other one to an operating driving arm, the cartridge, i.e. the control unit, comprises a fixed stationary inlet disc and a moving control disc arranged on above the other to form a plane sealing, and the other side of the inlet disc is in connection with a footing, whereas at the side of the inlet disc opposite to the control disc is in a forced connection with the ceramic moving element, which, in turn, is in an operation connection with an operating driving arm, and on the footing, inlet openings for the cold and hot water and an outlet opening are situated.

The essence of the invention lies in that on the footing at least one inlet opening for the hot water, one inlet opening for the cold water and two outlet openings are developed, and the operating driving arm comprises at least two separate outlet openings, preferably one for filling the tub and one for the shower which are controlled independently and can be switched at least towards two outlet openings.

One of the preferred embodiments of the faucet insertion according to the invention is developed so that in functioning towards one of the outlets, the operating arm can be adjusted by a degree of a for control the water amount, whereas for control the ratio of the cold and hot water, i.e. the temperature of the water flowing out, the arm should be turned clockwise by a degree of β.

Another embodiment of the faucet insertion according to the invention is constructed so that in operating towards the other outlet opening, the operating driving arm is in a vertical direction, its tilting backwards is hindered by a bumper, and by rotating or turning the operating driving arm counter-clockwise by a degree of δ, the temperature of the outflow water, i.e. the ratio of the cold and hot water can be controlled.

Preferably one of the outlet openings is for filling the tub, the other one is used for the shower.

BRIEF DESCRIPTION OF THE DRAWINGS

In what follows, the invention is described in detail on the basis of the embodiment shown as an example in the figures included.

DETAILED DESCRIPTION OF THE INVENTION

Figure 1:
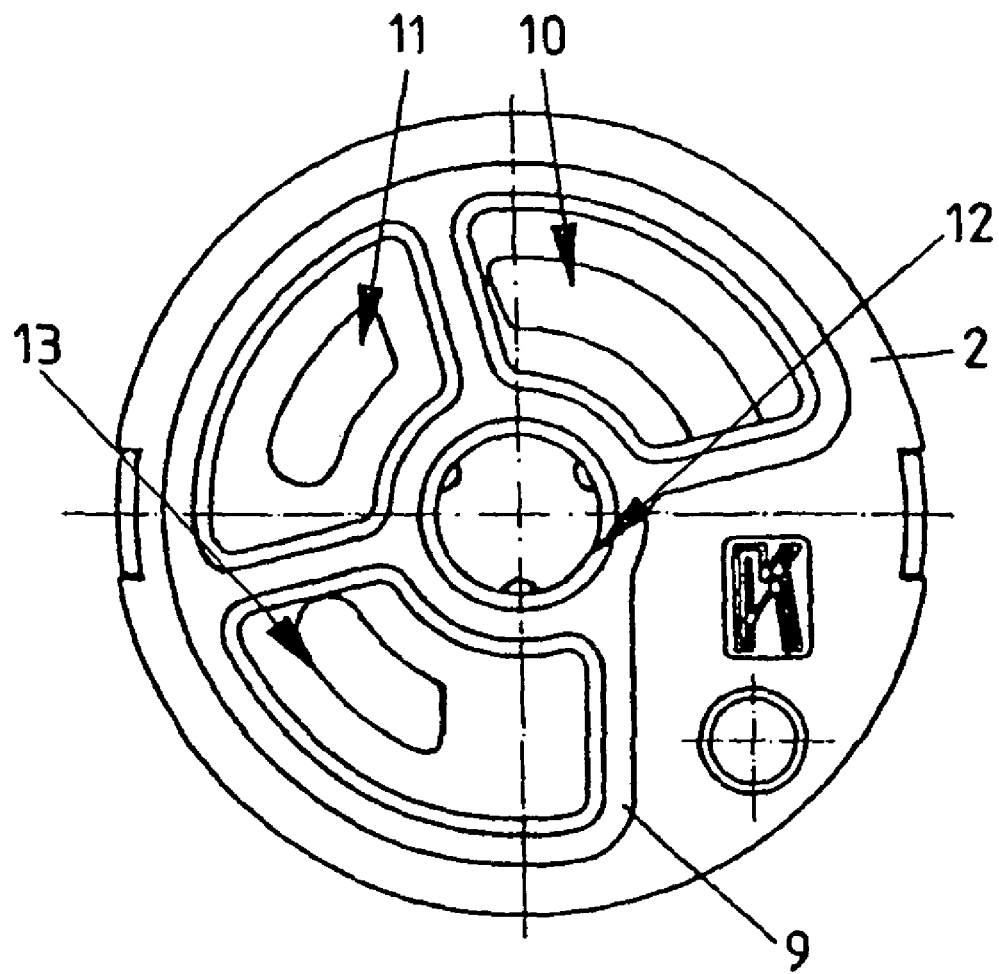
FIG. 1 shows the cartridge according to the invention in its bottom view showing the inlet and outlet openings, In FIG. 2 the top view of an embodiment as an example for the inlet disc in the cartridge according to the invention is seen.

Turning to the Figures, FIG. 1 shows the bottom view of the cartridge, i.e. looking at it from footing 2, where a cold water inlet opening 10, a hot water inlet opening 11, an outlet opening 12 for the tub filling, and an outlet opening 13 for the shower are to be seen. A profile of the seal 9 is also shown in the figure.

Figure 2:
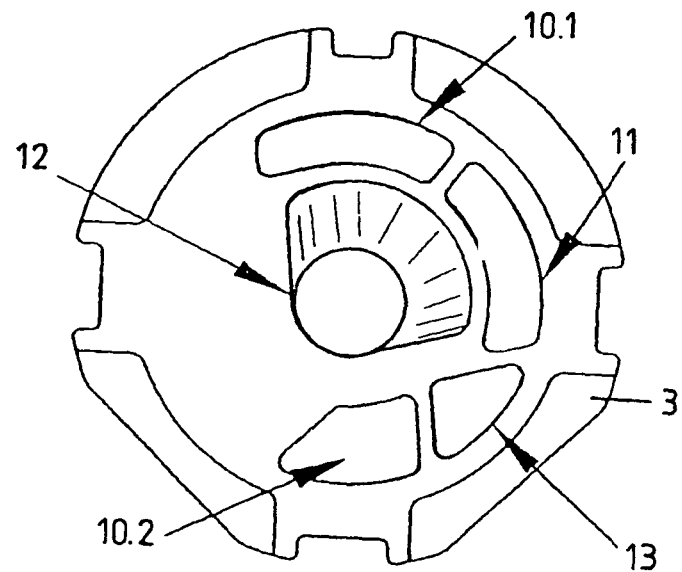

In FIG. 2, an embodiment as an example for the ceramic inlet disc 3 is seen in its top view. The position of the individual openings can be seen, i.e. an inlet opening 10.1 for cold water to tub filling, an inlet opening 10.2 for cold water to the shower, an inlet opening 10 for cold water, an inlet opening 11 for hot water, an outlet opening 12 to tub filling and another outlet opening 13 to the shower.

Figure 3:
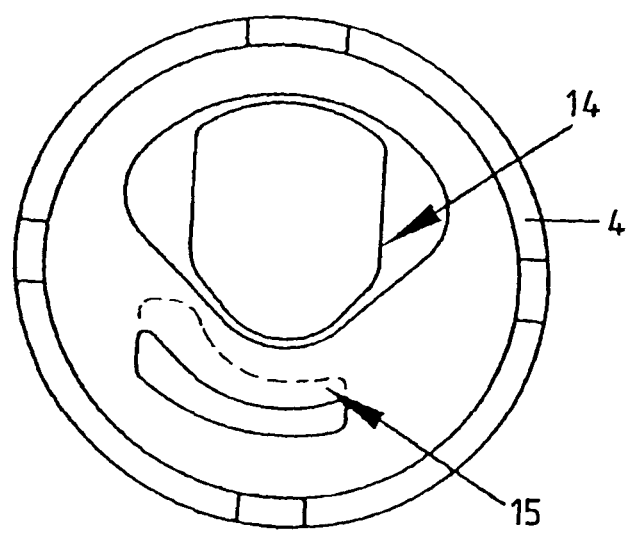
FIG. 3 illustrates the top view of the control disc in an embodiment as an example in the cartridge according to the invention, In FIG. 4a the cartridge as an example of an embodiment according to the invention is shown in a vertical section.

FIG. 3 shows the upper, moving ceramic control disc 4 together with mixing space 14 for tub filling, and mixing space 15 belonging to the shower. As the latter is positioned underneath, it is indicated by a broken line.

Figure 4A:
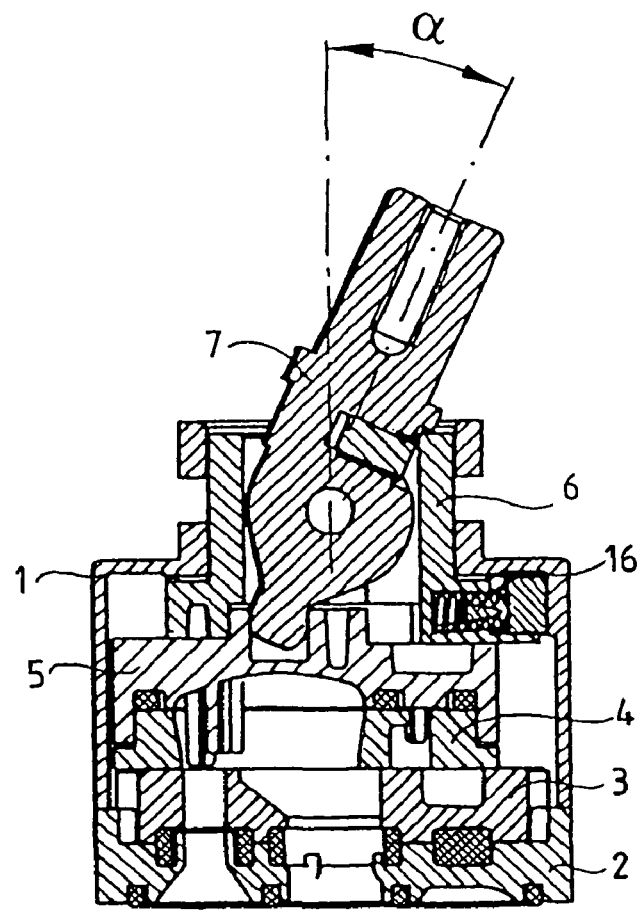
FIG. 4b shows the cartridge in FIG. 4a in its top view.

In order to achieve the aim, i.e. that two separate outlets (to the tub and the shower) could be arranged, the operating driving arm of the cartridge according to the invention is developed so that it could be operated in two positions, between which it can be switched over. One of these positions is shown in FIG. 4a, where the cartridge according to the invention can be seen in its longitudinal section. The cartridge comprises the ceramic discs arranged one above the other to form thus together a plane sealing, the inlet disc 3 and control disc 4. At the opposite side of control disc 4 to inlet disc 3, control disc 4 is in a forced connection with a ceramic moving element 5, to which ceramic moving element 5, an arm holder 6 and an operating driving arm 7 is connected.

Figure 4B:
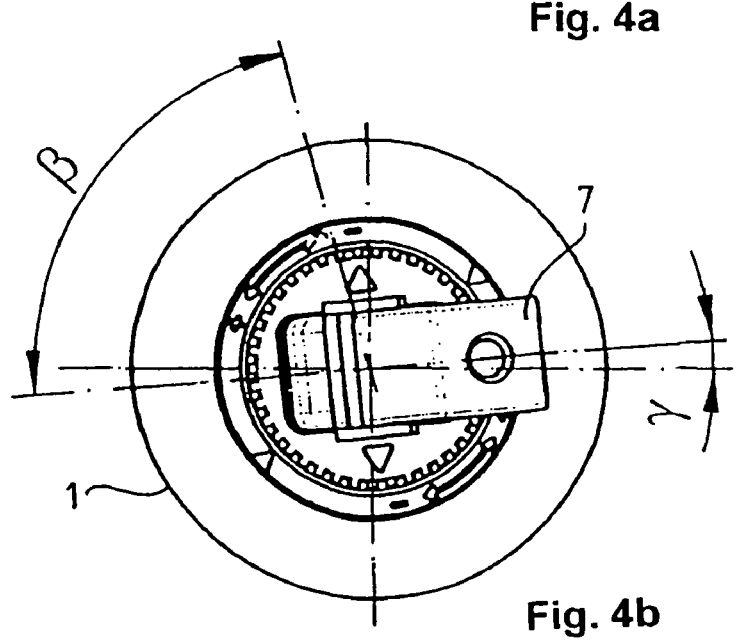
Figure 5D:
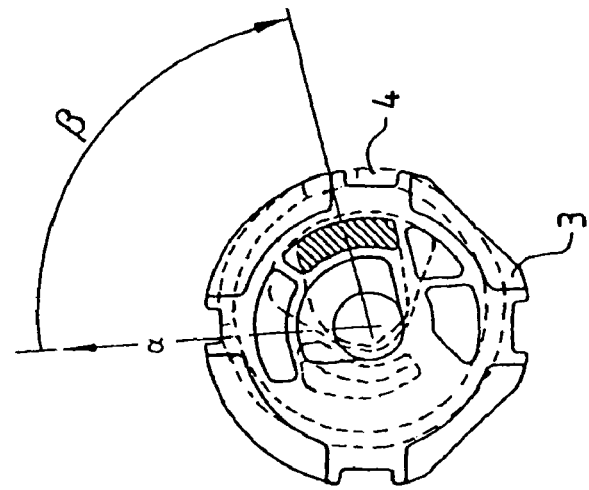
FIGS. 5a-5d illustrate the process of mixing the cold and hot water at filling of the tub by showing the positions of the two discs arranged above each other during mixing operation.
Figure 5C:
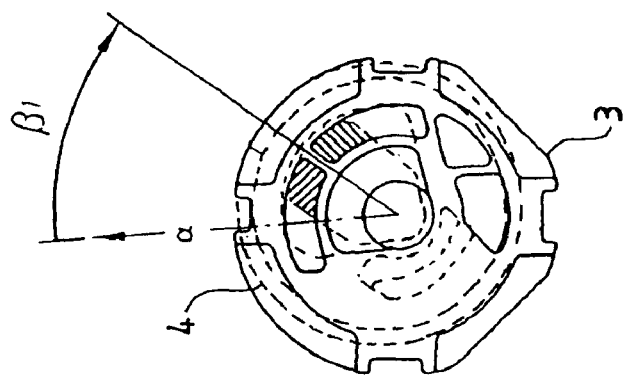
Figure 5B:
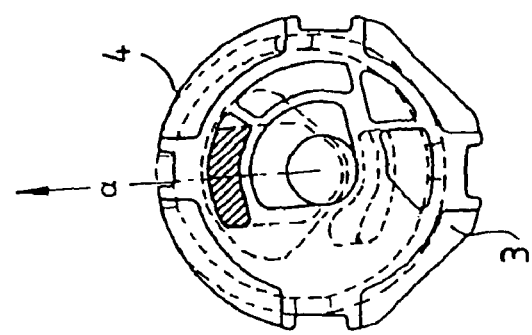
Figure 5A:
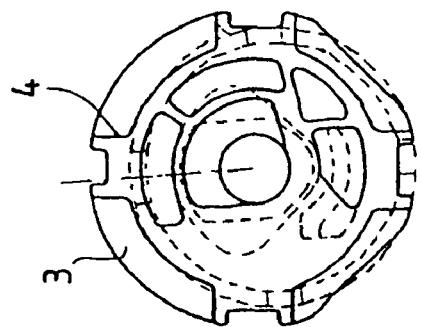

FIG. 4b is the top view of the cartridge shown in FIG. 4a.

In its basic position, the cartridge is rotated counter-clockwise by a degree of γ. This ensures that after assembling it into the insertion and tightening, by tilting the operation driving arm 7 in its mid-position by a degree of α, the cartridge lets cold water flow through the outlet opening 12 for filling the tub. By turning the driving arm 7 clockwise, the inlet opening 11 is gradually opened, thus the temperature of the outflow water starts to warm up. Turning it by a degree of β, the movement is limited by a bumper. In this case, only warm water gets into the outlet.

By turning the driving arm 7t back to the initial position in its opened state, also a bumper hinders its turning further.

FIGS. 5a-5d illustrate the adjusting of the water temperature by operating driving arm 7 in its tub-filling position. In this position, by setting the arm by a degree of α, the amount of the water, whereas by a degree of β the temperature of the water can be controlled.

Figure 6A:
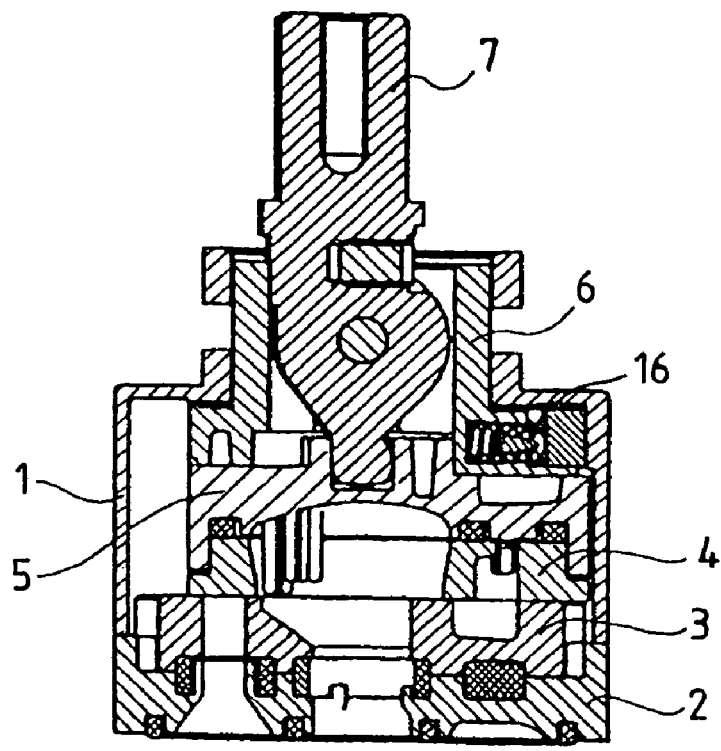
FIG. 6a is the embodiment of the cartridge according to the invention in the shower position in its vertical section.
Figure 6B:
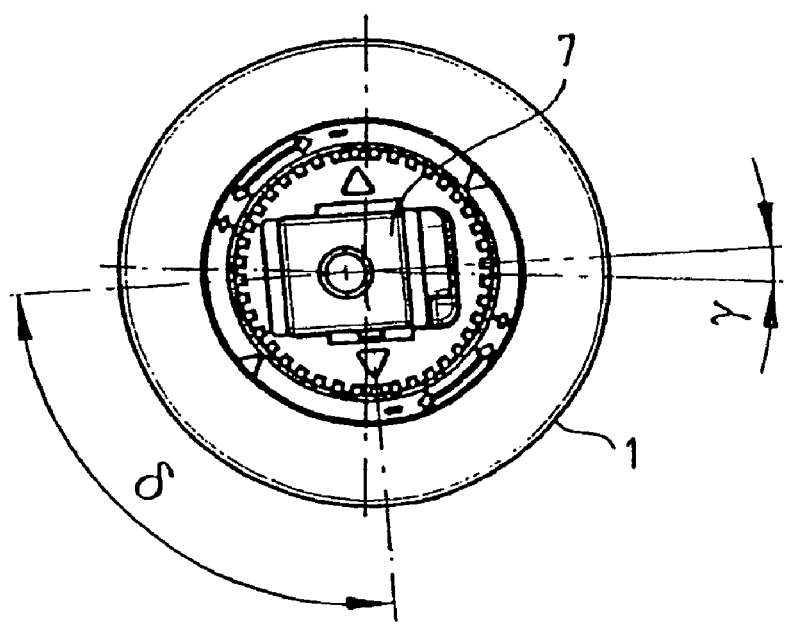
FIG. 6b shows the top view of the cartridge shown in FIG. 6a, FIGS. 7a-7d show the process of mixing cold and hot water in the shower position by showing the positions of the two discs lying above each other at mixing.
Figure 7D:
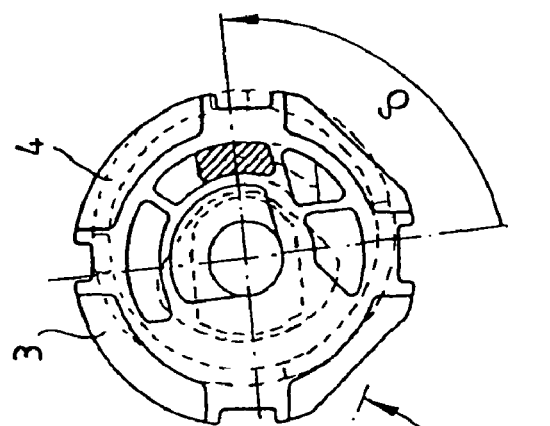
Figure 7C:
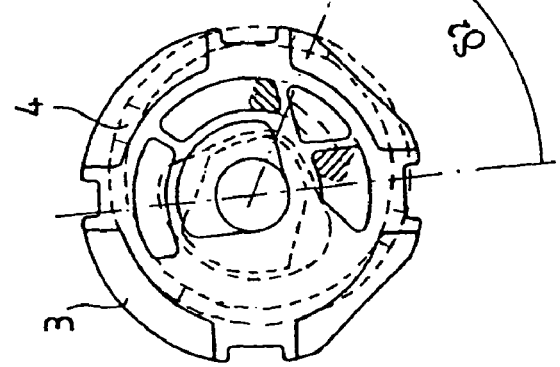
Figure 7B:
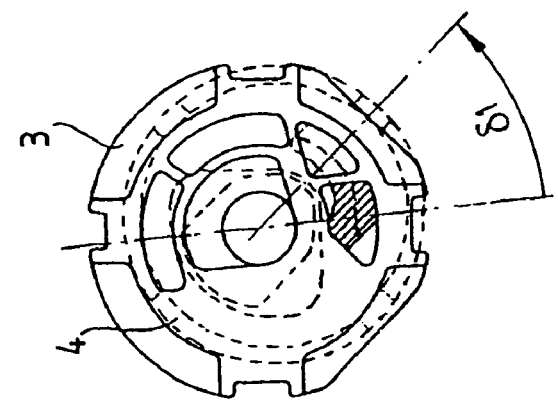
Figure 7A:
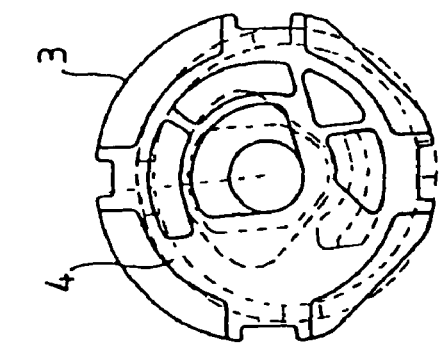

In FIG. 6a, the operating driving arm 7 of the cartridge according to the invention is shown in its other function, i.e. in its shower position. In this position the operating driving arm 7 is set vertically, —switching between the two kinds of operation occurs by force—and the driving arm 7 can be turned also counter-clockwise up to a degree of δ. In this case water is let flow towards the outlet opening 13 of the shower. In this operation region, the temperature of the water flowing through can be adjusted by turning operating driving arm 7 to the appropriate degree of δ, and the amount of the water flowing through cannot be changed. The dumping back of driving arm 7 is inhibited by fixing element 16 provided with a spring.

The flow of water is controlled by a smaller cavity on control disc 4—the so-called mixing space—, the flow goes from inlet opening 10.2 of cold water and inlet opening 11 of warm water to outlet opening 13. At turning the driving arm 7 by a degree of δ, the ceramic control disc 4 opens first the way for cold water (up to δ1). By turning it further, it opens also the inlet opening 11 for warm water (δ2), whereas at turning it further to δ, only warm water arrives at outlet opening 13 (FIGS. 7a-7d).

Closing of the outlet opening 13 of the shower occurs by turning back to the basic start position. Then, a fixing element with spring 16 helps to find the basic position.

Thus, it can be seen that by a single operating driving arm adjustable to two different positions and operable in them is capable of control independently two individual outlet openings—for tub filling and for shower—by means of at least one warm water inlet opening and one cold water inlet opening.

The invention claimed is:

1. An insertion piece to a single-grip mixing faucet developed as a control unit, the control unit being connected on one side to a footing having a warm water inlet and a cold water inlet, and on an opposite side to a driving arm, the control unit comprising: a fixed stationary inlet disc and a moving control disc arranged above the inlet disc to form a plane sealing, the inlet disc being connected to a footing on a side opposite the control disc, the control disc being in connection with a ceramic moving element on a side opposite the inlet disc, the moving element being coupled to the driving arm, the inlet disc including at least one warm water inlet opening, at least one cold water inlet opening, and at least two outlets forming outlet openings, and the driving arm is capable of independently controlling the outlet openings so that water can only flow out of one of the outlet openings at a time depending on the vertical position of the driving arm.

2. The insertion piece to the single-grip mixing faucet according to claim 1, wherein rotation of the driving arm about a vertical axis adjusts the water amount, and wherein rotation of the driving arm in a clockwise direction adjusts the ratio of cold and warm water to affect the temperature of the outflow water.

3. The insertion piece to a single-grip mixing faucet according to claim 1, further comprising a bumper for limiting rotation of the driving arm, wherein when the driving arm is in the vertical position, rotation of the driving arm in a counter-clockwise direction adjusts the ratio of cold and warm water to affect the temperature of the outflow water.

4. The insertion piece to a single-grip mixing faucet according to claim 1, wherein one of the outlet openings is an outlet opening for filling a tub, and the other outlet opening is an outlet opening for operating a shower.

5. The insertion piece to a single-grip mixing faucet according to claim 2, wherein one of the outlet openings is an outlet opening for filling a tub, and the other outlet opening is an outlet opening for operating a shower.

6. The insertion piece to a single-grip mixing faucet according to claim 3, wherein one of the outlet openings is an outlet opening for filling a tub, and the other outlet opening is an outlet opening for operating a shower.

\* \* \* \* \*